United States Patent
Bhosle et al.

(10) Patent No.: US 9,002,996 B2
(45) Date of Patent: Apr. 7, 2015

(54) TRANSACTION BASED SERVER CONFIGURATION MANAGEMENT SYSTEM AND METHOD THEREFOR

(75) Inventors: Mayur Bhosle, Round Rock, TX (US); Prakash Nara, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 282 days.

(21) Appl. No.: 13/597,896

(22) Filed: Aug. 29, 2012

(65) Prior Publication Data

US 2014/0068024 A1  Mar. 6, 2014

(51) Int. Cl.
*G06F 15/177* (2006.01)

(52) U.S. Cl.
CPC .................................. *G06F 15/177* (2013.01)

(58) Field of Classification Search
None
See application file for complete search history.

(56) References Cited

U.S. PATENT DOCUMENTS

| | | | |
|---|---|---|---|
| 6,014,669 A * | 1/2000 | Slaughter et al. | 707/610 |
| 6,847,993 B1 | 1/2005 | Novaes et al. | |
| 7,010,617 B2 | 3/2006 | Kampe et al. | |
| 7,519,801 B2 * | 4/2009 | Martinez et al. | 713/1 |
| 7,617,292 B2 | 11/2009 | Moore et al. | |
| 7,783,696 B2 | 8/2010 | Davis et al. | |
| 2003/0204612 A1 * | 10/2003 | Warren | 709/230 |
| 2005/0015471 A1 | 1/2005 | Zhang et al. | |
| 2005/0149712 A1 * | 7/2005 | Martinez et al. | 713/1 |
| 2011/0173303 A1 | 7/2011 | Rider | |

* cited by examiner

*Primary Examiner* — Brian P Whipple
(74) *Attorney, Agent, or Firm* — Larson Newman, LLP

(57) ABSTRACT

A request to perform a system configuration operation at an information handling system is received at a service processor included at the information handling system. The service processor determines that the configuration operation completed successfully and prepares an abstraction of the system configuration operation that can be used to replicate the system configuration operation at another information handling system. The abstraction is provided to a coordinating processor. The coordinating processor generates an identifier that uniquely identifies the abstraction and provides the identifier to the service processor. The service processor stores the identifier.

20 Claims, 8 Drawing Sheets

TRANSACTION BASED SERVER CONFIGURATION MANAGEMENT SYSTEM AND METHOD THEREFOR

FIELD OF THE DISCLOSURE

This disclosure generally relates to information handling systems, and more particularly relates to a transaction based server configuration management system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today, an enterprise may utilize information handling systems that include a large number of individual computers known as servers. Administration of large systems of servers can be a complex task.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Figure 1:
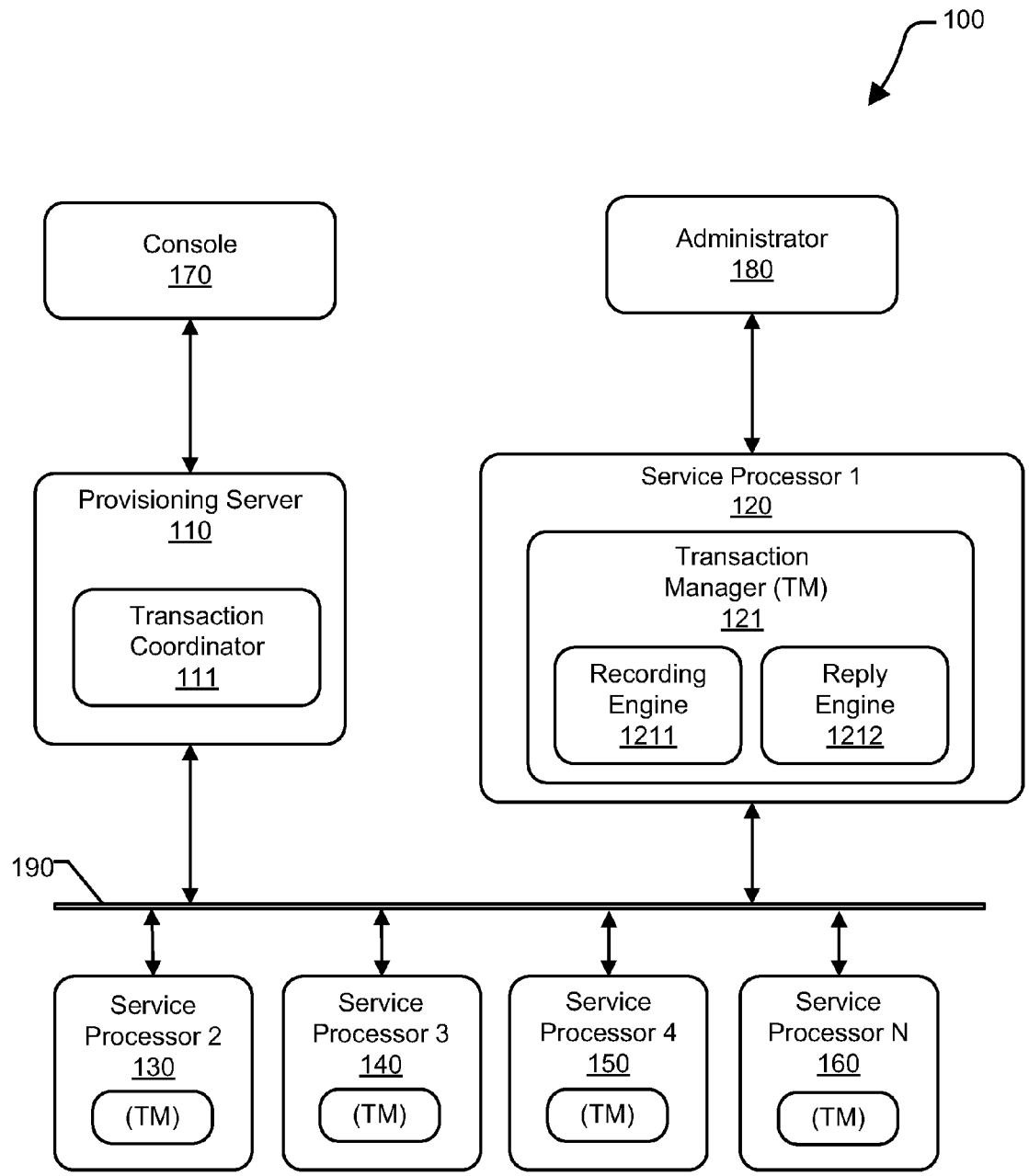
FIG. 1 is a block diagram illustrating an information handling system according to an embodiment of the present disclosure.

FIG. 1 shows an information handling system 100 according to a specific embodiment of the present disclosure. The system 100 includes a provisioning server 110 and service processors 120, 130, 140, 150, and 160. Each one of service processors 120-160 represents a management controller associated with a corresponding server (not shown at FIG. 1). A network 190 supports communication between the provisioning server 110 and each of the processors 120-160. The system 100 also includes a console 170 to provide administrative access and status information associated with the processors 120-160. In addition, one or more of the service processors 120-160 can include an interface for use by an administrator 180. In an embodiment, the information handling system 100 can represent a server rack housing an array of individual blade servers. Each blade server can include a service processor, such as service processor 120.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

As used herein, the term service processor is used to refer to a processor configured to facilitate management of an information handling system. Accordingly, a service processor may be referred to as a management controller. A service processor can include a central processing unit, volatile and nonvolatile memory devices, a network interface controller (NIC), and the like. A service processor can perform many system management functions, including monitoring system status, performing diagnostic services, facilitating installation of device firmware and other device and server software, and the like. For example, when a new blade server is installed at a server rack, a service processor included in the new blade server can facilitate deployment and provisioning of the server. Deployment and provisioning refers to the act of installing requisite software, specifying configuration parameters, loading an operating system and similar activities.

A server, such as a blade server, can include more than one processor configured to support system management tasks. For example, a service processor included at a server may communicate with additional satellite controllers distributed within an individual server using a serial bus or another communication interface. In addition, a service processor included at a server can communicate with one or more management controllers external to the server, for example the provisioning server 110. A service processor, such as each of service processors 120-160, may be referred to as a baseboard management controller (BMC). Alternatively, a server can include multiple management sub-systems including a BMC and one or more additional service processors. An integrated remote access controller is yet another embodiment of a service processor. The techniques disclosed herein are described in the context of a server chassis including multiple servers. One skilled in the art will appreciate that these techniques are applicable to any information handling system having multiple processors, including information handling systems where constituent processors are not in the same location.

A server rack or other type of chassis that includes multiple processing systems can include a chassis management controller (CMC), such as the provisioning server 100 at the information handling system 100. The CMC can provide a human-interface to devices installed at the chassis in addition to communication with individual service processors. The CMC and the service processors are devices that can execute computational processes defined by software programs installed at each device.

In an embodiment, a service processor is configured to operate independently of the state of a primary central processing unit (CPU) and independently of the state of an operating system (OS) installed at the CPU, referred to herein as out-of-band management. A service processor can include a unique Internet Protocol (IP) address and media access control (MAC) address to facilitate communication and interaction with the service processor. A service processor can support one or more interface protocols to allow administrative personnel or other devices and processes to interact with the service processor. For example, a service processor can provide a graphical user interface (GUI) that displays system status and allows an administrator to configure operation of an associated server. Any operation that changes the configuration of a service processor is referred to herein as a transaction. There are many standardized interface protocols in use today, such as Command Line Interface (CLI), Open Manage Server Administrator (OMSA), Intelligent Platform Management Interface (IPMI), Remote Access Controller Administrator (RACDAM), Web Services-Management (WSMAN) and the like. The service processors 120-160 and the provisioning server 110 of the information handling system 100 can operate in compliance with one or more of the standard protocols listed above, another standard protocol, or one or more proprietary protocols.

The console 170 can include a video monitor device for displaying a GUI provided by the provisioning server 110. In another embodiment, the console 170 can represent a processor and a display interface that is located remotely from the information handling system 100. The console 170 can be used to monitor the operation of the information handling system 100, including the operation of the service processors 120-160. The administrator interface 180 can be provided by each service processor or by the information handling system 100, and can represent a local or a remote interface to the information handling system 100. In an embodiment, the administrator interface 180 can be used by a technician to monitor and configure the operation of a service processor and a corresponding server. For example, a system administrator can utilize the administrator interface 180 to install software drivers, device firmware, configure network and storage devices, modify basic input/output system (BIOS) parameters, and the like.

Each server at the information handling system 100 includes a corresponding service processor, represented by service processors identified at FIG. 1 as service processor 1 through service processor N. Each service processor is configured to execute one or more processes and one of these processes is referred to herein as a transaction manager (TM), such as the transaction manager 121 at the service processor 120.

The provisioning server 110 is configured to execute another process, referred to herein as a transaction coordinator 111. Each transaction manager process can initiate communication with the transaction coordinator 111 and the transaction coordinator 111 can initiate communication with individual transaction managers 121. In addition, the transaction coordinator 111 can broadcast information to be received by all transaction managers 121. In an embodiment, communication between the transaction coordinator 111 and the transaction managers 121 can be conducted over an out-of-band network, such as the network 190. Together, the transaction coordinator 111 and the transaction managers 121 administer a method for managing servers included at the information handling system 100 of FIG. 1.

Each transaction manager, such as the transaction manager 121 at the service processor 120, includes a transaction recording engine 1211 and a transaction replay engine 1212. The transaction recording engine 1211 is configured to record all operations performed at the service processor. For example, a system administrator can perform an operation to update the configuration of a service processor using an interface protocol such as WSMAN, RACADM, a GUI, or the like. If the operation is successful, the transaction recording engine 1211 generates a transaction abstraction operable to reproduce the recorded configuration operation at another service processor having a similar system management stack. The transaction recording engine 1211 invokes a SetLatest-ServerProfile command to transmit the generated abstraction to the transaction coordinator 111.

The transaction replay engine 1212 is configured to listen for commands and notifications from the transaction coordinator 111. A transaction manager, such as a transaction manager at each of the service processors 120-160, maintains a record of the latest configuration operation performed at the corresponding service processor. Each configuration operation is identified by a TransactionID that is unique to that operation. Accordingly, the transaction manager 121 at each service processor updates a database to indicate the TransactionID of the most recent configuration operation performed at that service processor. If the transaction replay engine 1212 receives a notification from the transaction coordinator 111 that a new configuration update is available, as indicated by a TransactionID that is sequentially greater than the TransactionID presently stored at the transaction manager, the transaction replay engine 1212 can issue a GetLatestServerProfile command to request a transaction abstraction providing the new configuration operation. If the transaction replay engine 1212 receives a SetBaseline command from the transaction coordinator 111, the transaction replay engine 1212 generates a configuration snapshot reflecting the current configuration of the associated service processor. The configuration snapshot includes all configuration information included at the selected service processor. Accordingly, the configuration snapshot can be used to configure or restore another service processor to a substantially identical configuration state as the selected service processor. The configuration snapshot can be referred to as a restore point.

The operation of the transaction coordinator and transaction managers can be better understood with reference to FIGS. 2-7 described below.

Figure 2:
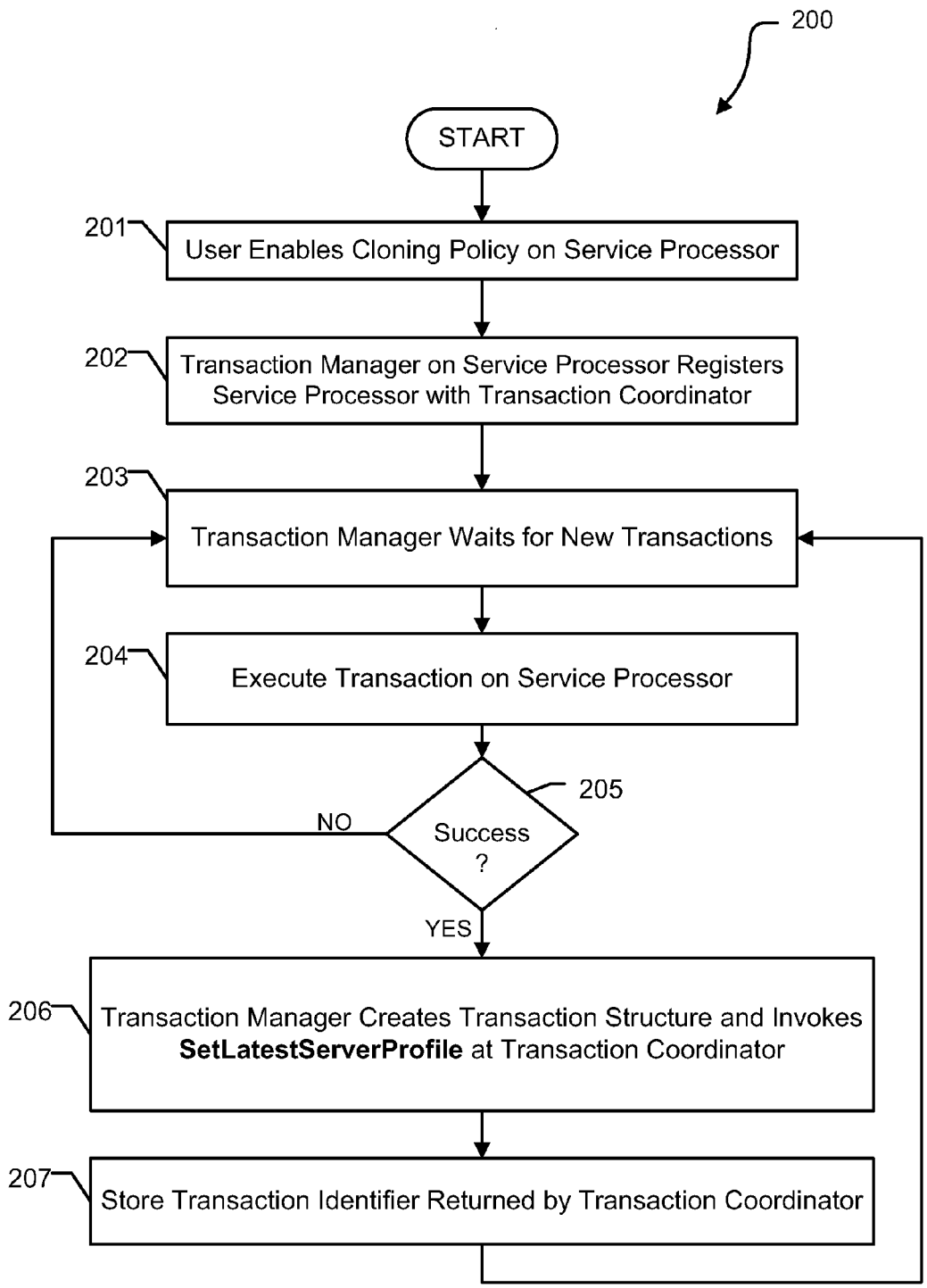
FIG. 2 is a flow diagram illustrating a method of operating a transaction manager according to an embodiment of the present disclosure.

FIG. 2 shows a method 200 performed by a transaction manager according to an embodiment of the present disclosure. The method 200 begins at block 201 where a user enables a cloning policy on a service processor. For example, a system administrator 180 can use an interface at the service processor 120 to enable a transaction manager process 121 at the service processor 120. The flow proceeds to block 202 where the transaction manager registers the associated server with a transaction coordinator. For example, the transaction manager 121 can transmit a notification to the transaction coordinator 111 at the provisioning server 110 using the network 190. The flow proceeds to block 203 where the transaction manager waits for a notification identifying a new transaction. As used herein, the term transaction refers to an operation that changes the configuration of the associated server. The flow proceeds to block 204 where a transaction is executed at the service processor. For example, a system administrator 180 can use a command line interface, a GUI, or another interface protocol to modify the configuration of the server associated with the service processor 120. The modification can include a change to a value of a parameter included at a BIOS, a change to an operating mode of a RAID (redundant array of independent disks) controller, an update to firmware associated with a NIC, and the like.

The flow proceeds to block 205 where the transaction manager determines whether the transaction completed successfully. For example, the transaction manager 121 can determine that firmware at a NIC was successfully updated based on an acknowledgment received from the NIC hardware. If the operation was not successful, the flow returns to block 203 where the transaction manager waits for a notification identifying a new transaction. If the transaction of block 204 completed successfully, the flow proceeds to block 206 where the recording engine at the transaction manager creates a transaction structure and invokes a SetLatestServerProfile command at the transaction coordinator. The transaction structure, also referred to herein as an abstraction, is a data package that includes all information necessary for replicating the configuration operation at another service processor. The abstraction can include meta-data that specifies the type of operation and the target of the operation, and a data payload that encapsulates source data used in the operation. For example, the abstraction can include meta-data that identifies the operation as a firmware upgrade and identifies the target as a specific NIC, and a payload that encapsulates the particular firmware code that was installed at the NIC.

The configuration operation that is being abstracted may have been conducted using a standard interface and protocol such as WSMAN, RACDAM, or the like. The recording engine 1211 at the transaction manager 121 can encode the configuration operation to provide an abstraction that is compliant with established syntax and format rules. In particular, the format of the abstraction can be recognized by a replay engine at a transaction manager at another service processor. The format of the abstraction can include a known or a proprietary data format and syntax. The SetLatestServerProfile command initiated by the transaction manager 121 informs the transaction coordinator 111 that a configuration operation successfully completed at the service processor 121 and provides the corresponding abstraction to the transaction coordinator 111. In response to receiving the abstraction, the transaction coordinator 111 generates an identifier, referred to herein as a TransactionID, that uniquely identifies the abstraction. The transaction coordinator 111 provides the TransactionID to the service processor that issued the SetLatestServerProfile command. The transaction coordinator 111 processes SetLatestServerProfile commands serially and the TransactionIDs generated by the transaction coordinator 111 identifying the TransactionID as the latest transaction of a sequence of transactions registered at the transaction coordinator 111.

The flow proceeds to block 207 where the transaction manager stores the TransactionID returned by the transaction coordinator. Because TransactionIDs indicate a sequential order that transaction abstractions are received at the transaction coordinator 111, it is known that a service processor that has successfully completed a configuration operation associated with a particular TransactionID also includes updates associated with all preceding TransactionIDs.

Figure 3:
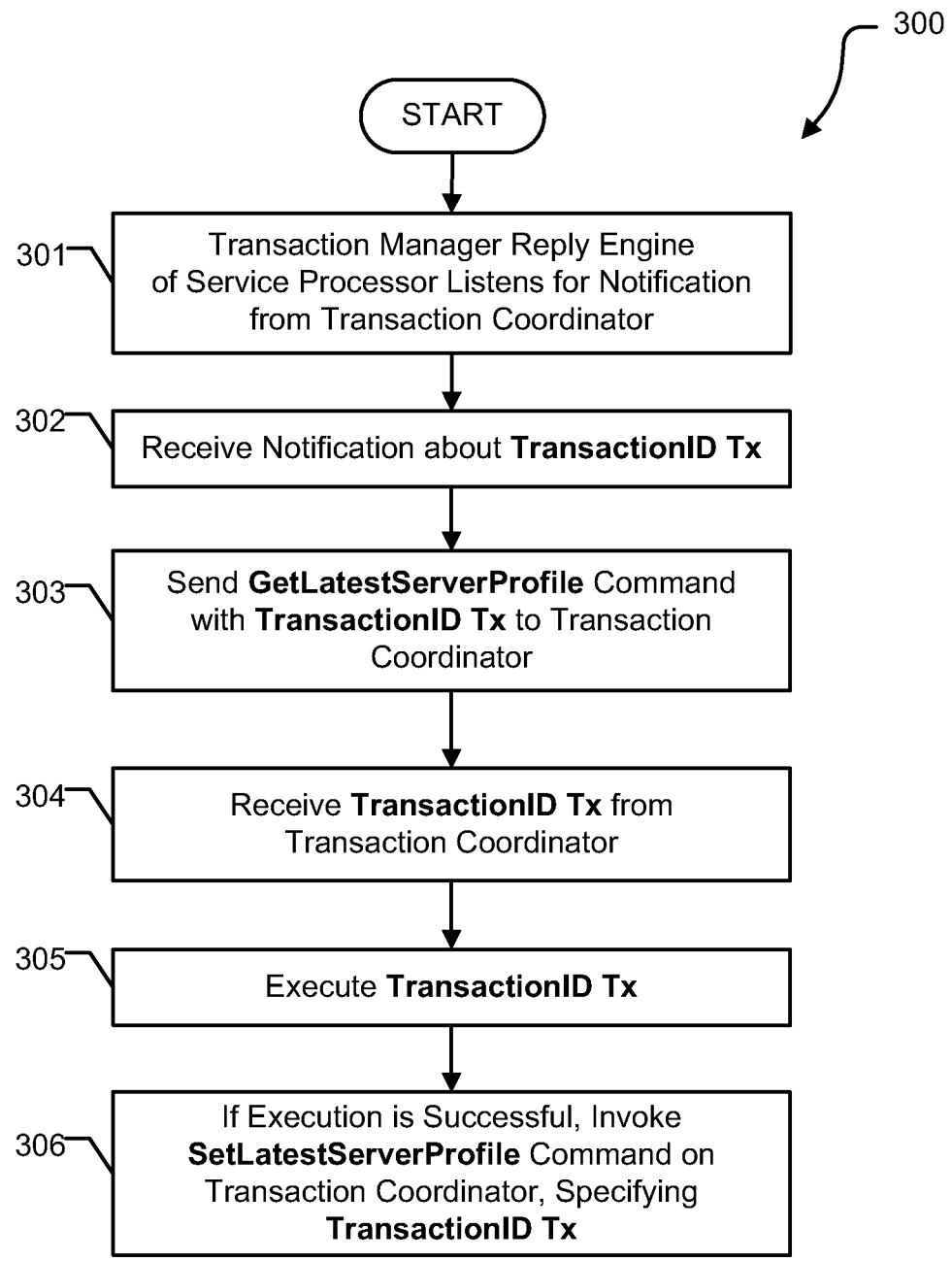
FIG. 3 is a flow diagram illustrating another method of operating the transaction manager according to an embodiment of the present disclosure.

FIG. 3 shows another method 300 performed by a transaction manager according to an embodiment of the present disclosure. In particular, the method 300 illustrates how the transaction coordinator 111, having received a transaction abstraction from a transaction manager 121 at one service processor, can notify other service processors at the information handling system 100 that a new configuration operation is available. The method 300 begins at block 301 where a transaction manager at a service processor listens for a notification from a transaction coordinator. For example, the replay engine 1212 at the transaction manager 121 at service processor 120 can receive a broadcast notification from the transaction coordinator 111 via the network 190. The flow proceeds to block 302 where a notification including a TransactionID Tx, is received at the transaction manager 121. For example, the transaction coordinator 111 can alert all registered service processors in the event that a new transaction abstraction has been received at the transaction coordinator 111, and that the transaction coordinator 111 has generated a corresponding TransactionID to uniquely identify the new abstraction. The flow proceeds to block 303 where the transaction manager 121 issues a GetLatestServerProfile command to the transaction coordinator 111, the command including the TransactionID Tx. For example, the transaction manager 121 at service processor 120 can determine that the TransactionID Tx corresponds to a configuration operation that has not been performed at the service processor 120. In response to receiving the GetLatestServerProfile command, the transaction coordinator 111 returns the abstraction identified by the TransactionID Tx to the transaction manager at the service processor 120.

At block 304 the abstraction corresponding to the TransactionID Tx is received at the transaction manager that issued the GetLatestServerProfile command, and the flow proceeds to block 305 where the configuration operation specified by the provided abstraction is executed by the corresponding replay engine 1212. One skilled in the art will appreciate that the service processors and associated system management stacks at service processors of FIG. 1 are substantially similar and are each configured to generate transaction abstractions that can be replayed by other transaction managers. In addition, each replay engine 1212 is configured to replay transaction abstractions generated by another transaction manager. The flow proceeds to block 306 where, in response to determining that the configuration operation specified by the received abstraction successfully completed, the transaction manager 121 invokes the SetLatestServerProfile command at the transaction coordinator. The command is accompanied by the TransactionID Tx. For example, the transaction manager at the service processor 120 can inform the transaction coordinator 111 that the requested configuration operation identified by the TransactionID Tx is installed at service processor 120.

Figure 4:
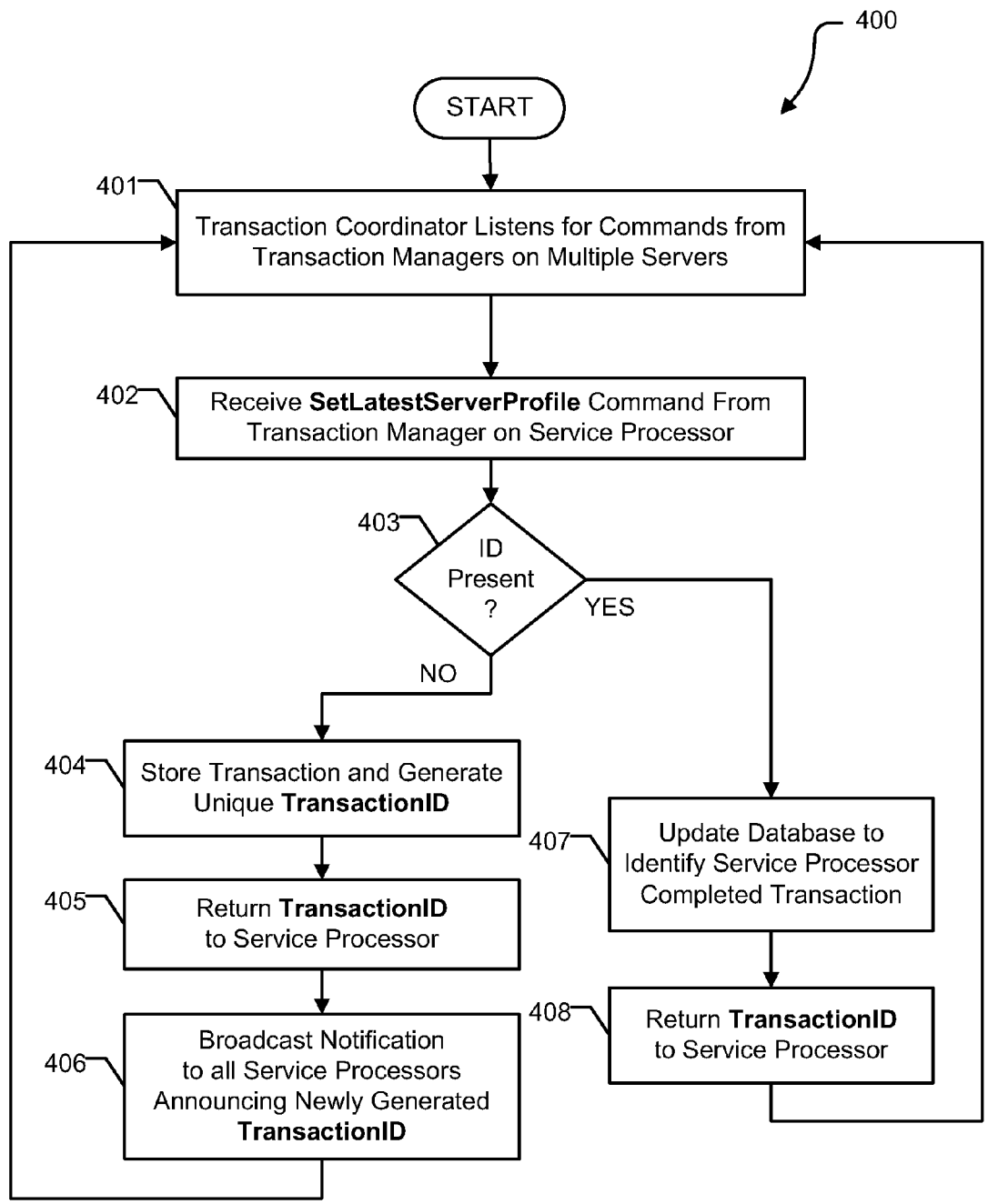
FIG. 4 is a flow diagram illustrating a method of operating a transaction coordinator according to an embodiment of the present disclosure.

FIG. 4 shows a method 400 performed by a transaction coordinator according to an embodiment of the present disclosure. The method 400 corresponds to the methods 200 and 300 of FIGS. 2 and 3, but from the perspective of the transaction coordinator 111. The method 400 begins at block 401 where a transaction coordinator listens for commands from transaction managers. For example, the transaction coordinator 111 can receive commands via the network 190 from transaction managers that have previously registered with the transaction coordinator 111. The flow proceeds to block 402 where a SetLatestServerProfile command is received at the transaction coordinator. For example, the transaction manager 121 can transmit a SetLatestServerProfile. The SetLatestServerProfile can include one of two arguments; either a transaction abstraction or a TransactionID. If the command includes an abstraction, the transaction coordinator 111 determines that the configuration operation specified by the abstraction is a new transaction that has not been registered at the transaction coordinator 111. Therefore, the transaction coordinator 111 generates a TransactionID to identify the abstraction. If the command instead includes a TransactionID, the transaction coordinator 111 determines that the SetLatestServerProfile command is an acknowledgment that a configuration operation identified by the TransactionID has been successfully installed.

The flow proceeds to the decision block 403 where the transaction coordinator determines whether the SetLatestServerProfile command includes a TransactionID. If the SetLatestServerProfile command does not include a TransactionID, the flow proceeds to block 404 where the transaction coordinator 111 stores the abstraction accompanying the command and generates a TransactionID that uniquely identifies the configuration operation identified by the abstraction. The flow proceeds to block 405 where the transaction coordinator 111 returns the generated TransactionID to the transaction manager 121 that issued the SetLatestServerProfile command, and updates a database at the transaction coordinator 111 to indicate that the present configuration status of the service processor that issued the command. The flow proceeds to block 406 where the transaction coordinator 111 broadcasts a notification to all service processors announcing the newly generated TransactionID. Returning to the decision block 403, if the SetLatestServerProfile command is accompanied by a TransactionID, the flow proceeds to block 407 where the transaction coordinator 111 updates the database at the transaction coordinator to indicate that the transaction manager 121 (that issued the SetLatestServerProfile command) successfully completed execution of the configuration operation identified by the TransactionID. The flow proceeds to block 408 where, in an embodiment, the transaction coordinator can return the received TransactionID to the originating transaction manager to acknowledge recording of the TransactionID.

Figure 5:
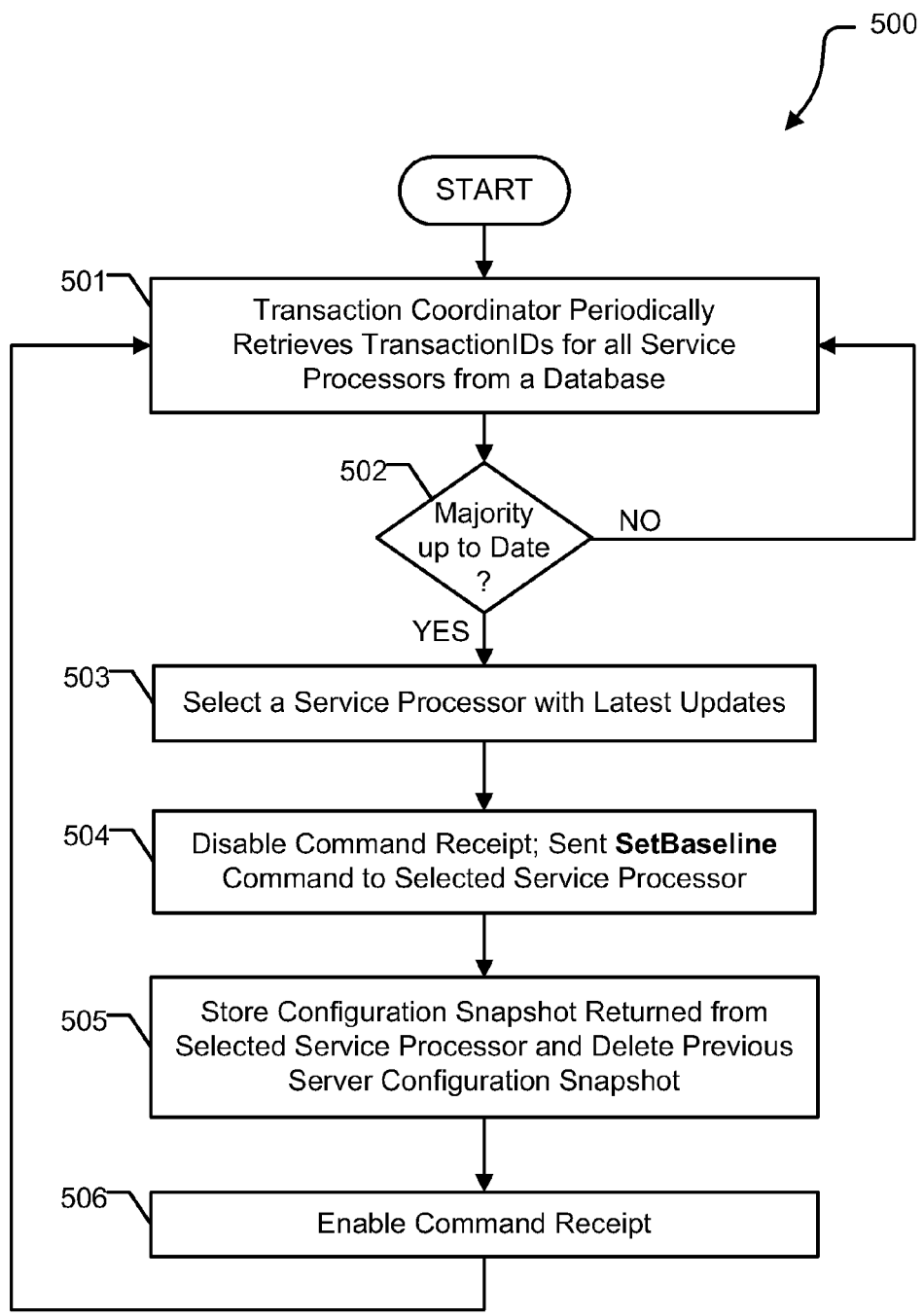
FIG. 5 is a flow diagram illustrating another method of operating the transaction coordinator according to an embodiment of the present disclosure.

FIG. 5 shows another method 500 performed by a transaction coordinator according to an embodiment of the present disclosure. The method 500 begins at block 501 where a transaction coordinator 111 periodically retrieves TransactionIDs associated with all service processors from a database. For example, the transaction coordinator 111 can maintain a record of the latest configuration operation completed at each service processor based on SetLatestServerProfile commands received from each transaction manager registered with the transaction coordinator 111. The flow proceeds to decision block 502 where the transaction coordinator 111 determines whether a simple majority of registered service processors have completed the most recent configuration operation. The flow proceeds to block 503 where the transaction coordinator selects one of the service processors from those identified to be fully updated. The flow proceeds to block 504 where the transaction coordinator disables command receipt and issues a SetBaseline command to the selected service processor. The transaction manager at the selected service processor prepares a configuration snapshot representing the current configuration of the service processor. It will be appreciated by one skilled in the art that this and other operations performed by the transaction coordinator 111 and each transaction manager are conducted in a serial manner. Commands can be received and buffered, however each command is typically executed in the order that the command is received.

The flow proceeds to block 505 where the transaction coordinator stores the configuration snapshot received from the selected service processor and deletes any previous stored snapshot. The system configuration specified by the configuration snapshot can be referred to as a baseline configuration. In other words, the configuration of a service processor can be brought to the baseline configuration by performing a restore operation using a configuration snapshot provided by the transaction coordinator 111. The flow proceeds to block 506 where the transaction coordinator 111 re-enables receipt of commands from registered transaction managers. One skilled in the art will appreciate that the transaction coordinator 111 can request a configuration snapshot from a transaction manager based on other criteria. For example, the transaction coordinator 111 can establish a new baseline configuration periodically, such as when a predetermined number of configuration operations have been performed.

Figure 6:
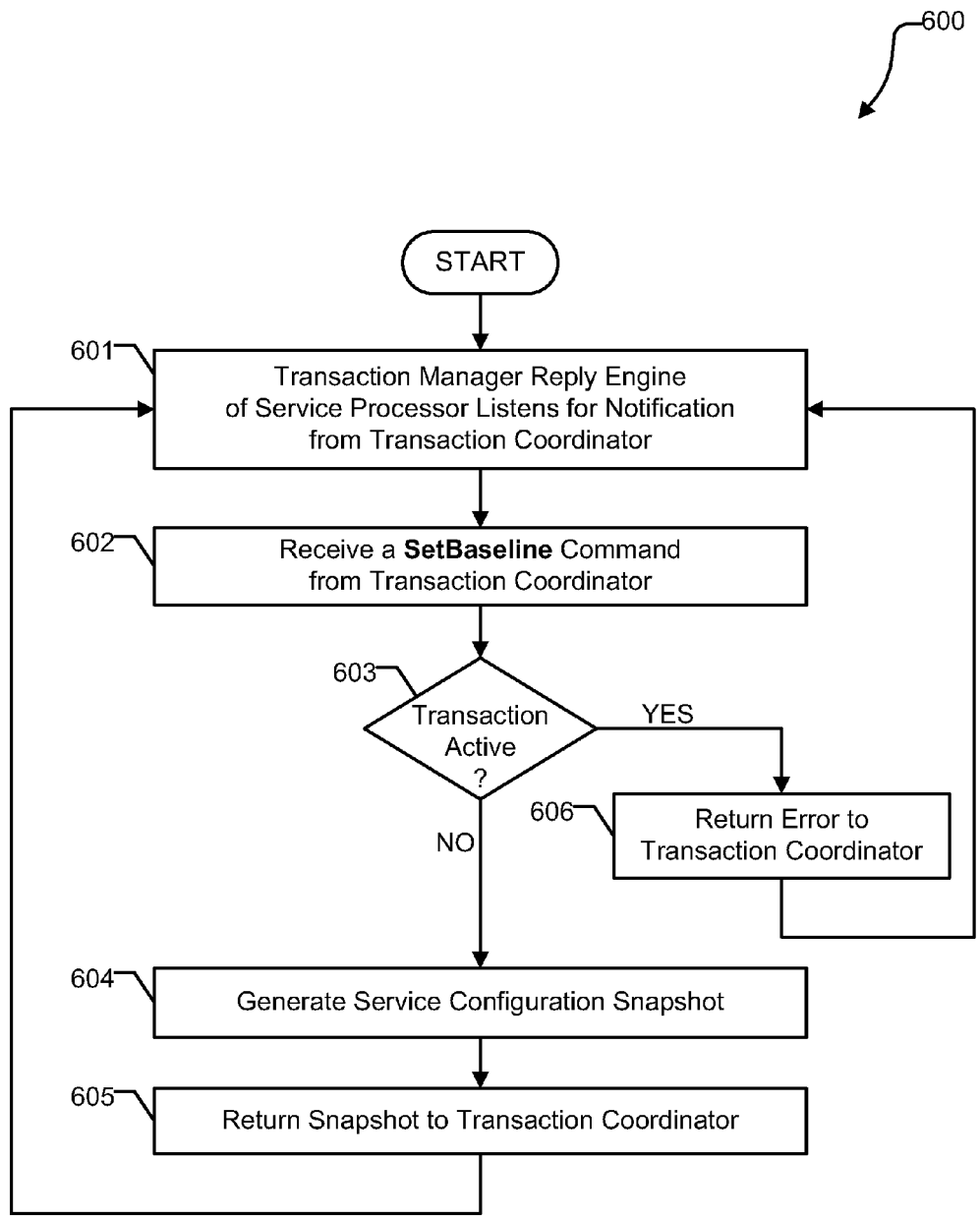
FIG. 6 is a flow diagram illustrating another method of operating the transaction manager according to an embodiment of the present disclosure.

FIG. 6 shows a method 600 performed by a transaction manager according to an embodiment of the present disclosure. The method 600 illustrates the generation of a configuration snapshot at a transaction manager in response to receiving a SetBaseline command from a transaction coordinator. The method 600 begins at block 601 where a transaction manager replay engine at a service processor listens for notifications from an associated transaction coordinator. For example, the replay engine 1212 at the transaction manager 121 is configured to receive notifications or commands issued by the transaction coordinator 111. At block 602, the transaction manager receives a SetBaseline command from the transaction coordinator. The flow proceeds to the decision block 603 where the transaction manager determines whether a transaction is currently active at the transaction manager 121. If a transaction is presently active, the flow proceeds to block 606 where an indication of an error condition is returned to the transaction coordinator and the flow returns to block 601. For example, the transaction coordinator can allow the transaction currently underway at the service processor to complete and be propagated to other service processors before once again requesting and storing a new configuration snapshot. Returning to decision block 603, if a transaction is not currently active at the transaction manager, the flow proceeds to block 604 where the transaction manager generates a configuration snapshot. As described above, the configuration snapshot provides a complete image of the state of the service processor. The flow proceeds to block 605 where the transaction manager returns the generated configuration snapshot to the transaction coordinator.

Figure 7:
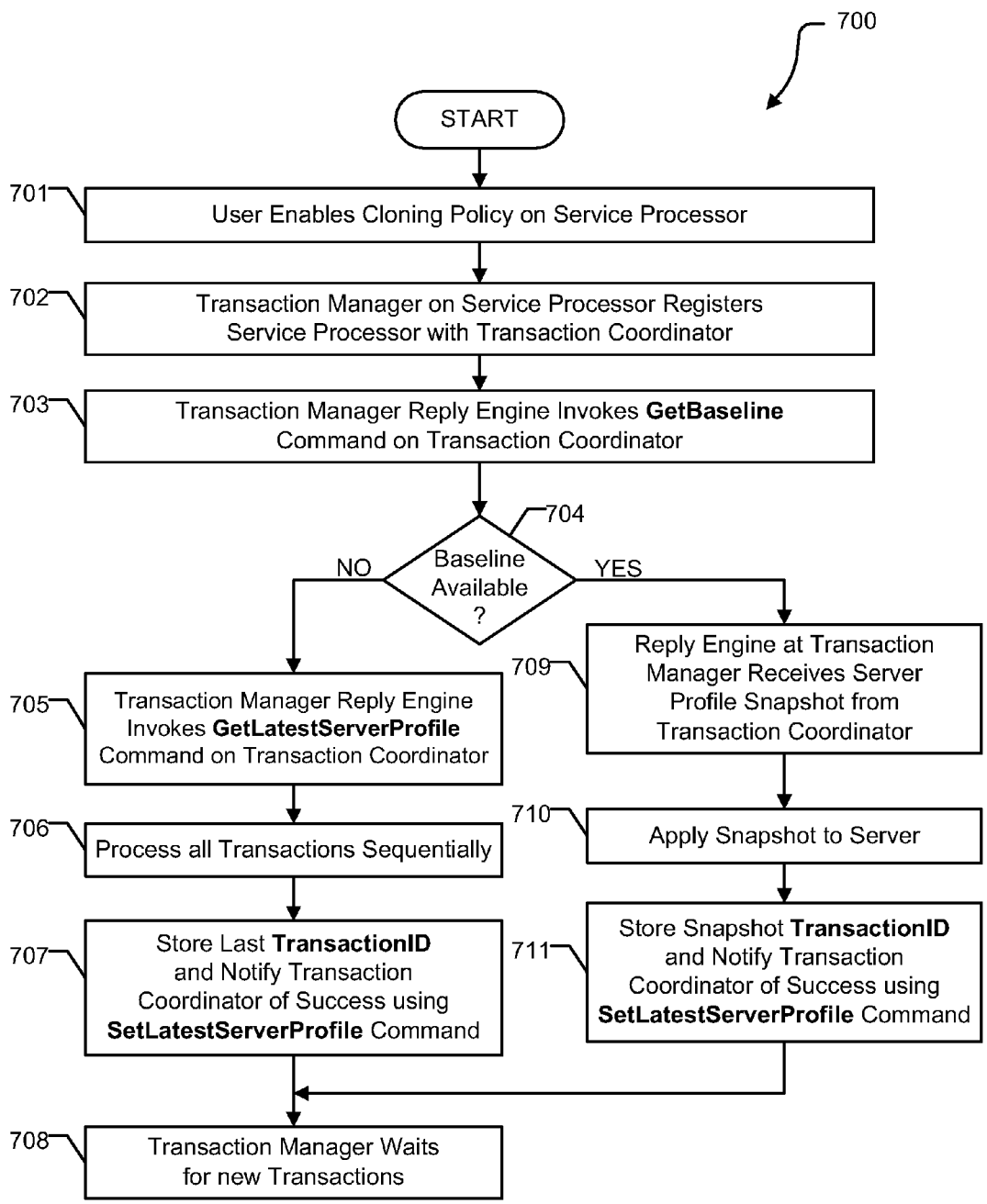
FIG. 7 is a flow diagram illustrating still another method of operating the transaction manager according to an embodiment of the present disclosure.

FIG. 7 shows a method 700 performed by a transaction manager according to an embodiment of the present disclosure. The method 700 illustrates a procedure for adding a new server that has not yet been configured to operate at the information handling system 100. The new server does include an active transaction manager process. The method 700 begins at block 701 where a system administrator enables a cloning policy at a service processor. The flow proceeds to block 702 where the transaction manager 121 at the service processor registers the service processor with a transaction coordinator 111. The flow proceeds to block 703 where the transaction manager 121 issues a GetBaseline command to request a configuration snapshot from the transaction coordinator. The flow proceeds to decision block 704 where the transaction coordinator 111 determines whether a configuration snapshot is available. If the transaction coordinator responds by indicating that a configuration snapshot is not available, the flow proceeds to block 705 where a replay engine at the transaction manager 121 issues a GetLatestServerProfile command to the transaction coordinator 111. If the transaction manager 121 has not executed a configuration operation and therefore does yet have a corresponding TransactionID, the GetLatestServerProfile command can be provided without arguments. The flow proceeds to block 706 where the transaction coordinator 111 responds to the command by providing all available abstractions to the transaction manager. The transaction manager 121 processes all of the transactions sequentially based on the TransactionID associated with each abstraction. The flow proceeds to block 707 where the transaction manager 121 stores the last TransactionID to indicate the latest configuration operation performed at the server, and notifies the transaction coordinator 111 that the transactions were successfully processed by issuing a SetLatestServerProfile command accompanied by the TransactionID associated with the last configuration operation. The flow proceeds to block 708 where the transaction manager 121 waits for a new transaction.

Returning to decision block 704, if the transaction coordinator responds by indicating that a configuration snapshot is available, the flow proceeds to block 709 where the replay engine 1212 at the transaction manager 121 receives a configuration snapshot from the transaction coordinator. The flow proceeds to block 710 where the snapshot is applied to the server. The flow proceeds to block 711 where the transaction manager 121 stores the last TransactionID that accompanied the configuration snapshot to indicate the latest configuration operation performed at the server, and notifies the transaction coordinator 111 that the baseline restore operation was successfully processed by issuing a SetLatestServerProfile command accompanied by the TransactionID that accompanied the snapshot. The flow proceeds to block 708 where the transaction manager 121 waits for a new transaction.

Figure 8:
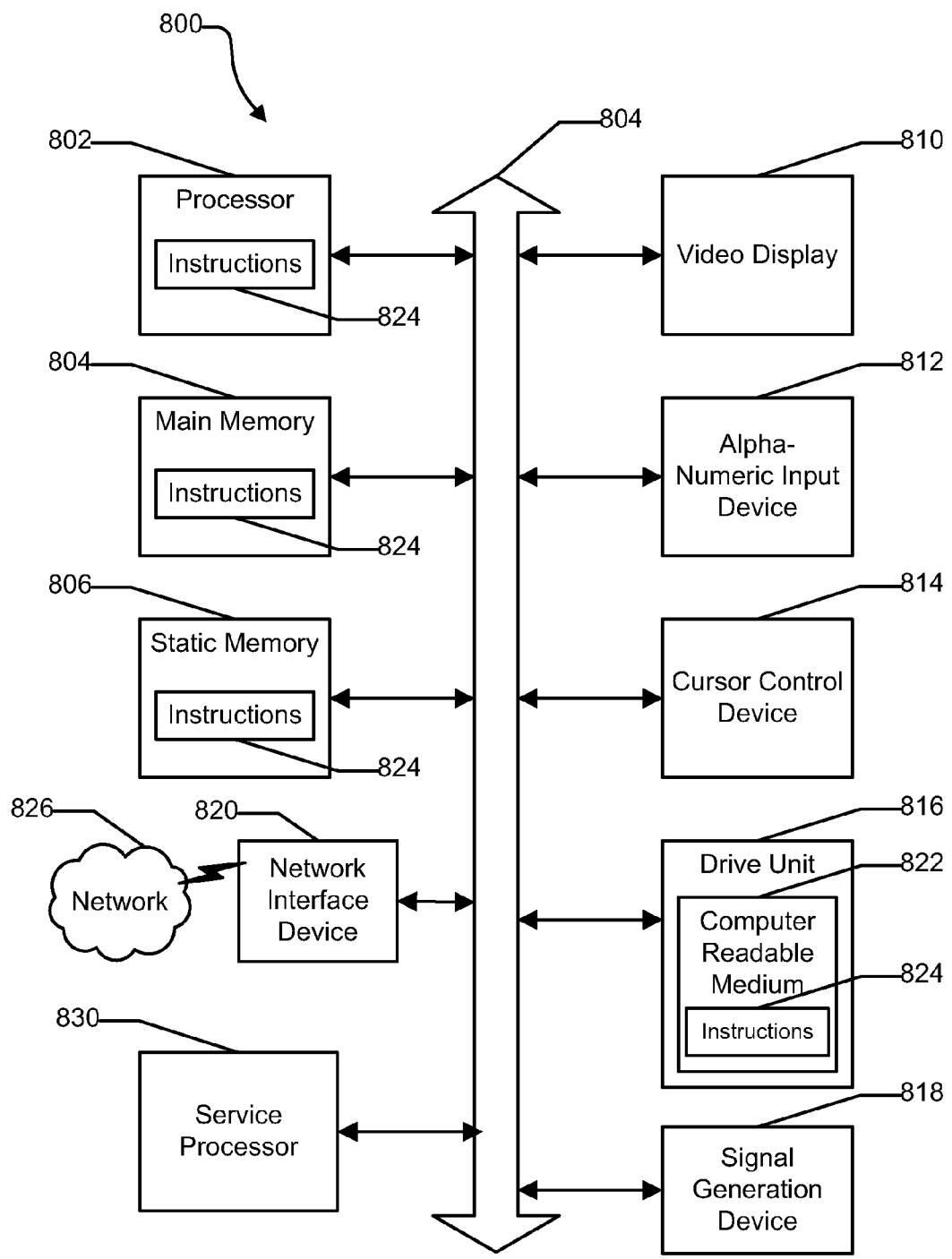
FIG. 8 is a block diagram of an information handling system according to an embodiment of the present disclosure.

FIG. 8 shows an information handling system 800 capable of administering each of the specific embodiments of the present disclosure. The information handling system 800 can represent servers included at the information handling system 100 of FIG. 1. The information handling system 800 may include a processor 802 such as a central processing unit (CPU), a graphics processing unit (GPU), or both. Moreover, the information handling system 800 can include a main memory 804 and a static memory 806 that can communicate with each other via a bus 808. As shown, the information handling system 800 may further include a video display unit 810, such as a liquid crystal display (LCD), an organic light emitting diode (OLED), a flat panel display, a solid state display, or a cathode ray tube (CRT). Additionally, the information handling system 800 may include an input device 812, such as a keyboard, and a cursor control device 814, such as a mouse. The information handling system 800 can also include a disk drive unit 816, a signal generation device 818, such as a speaker or remote control, and a network interface device 820. The information handling system 800 can include a service processor 830, described above. The information handling system 800 can represent a server device whose resources can be shared by multiple client devices, or it can represent an individual client device, such as a desktop personal computer.

The information handling system 800 can include a set of instructions that can be executed to cause the computer system to perform any one or more of the methods or computer based functions disclosed herein. The computer system 800 may operate as a standalone device or may be connected such as using a network, to other computer systems or peripheral devices.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The disk drive unit 816 may include a computer-readable medium 822 in which one or more sets of instructions 824 such as software can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the information handling system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal; so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving a first request at a first processor at a first information handling system, the first request to perform a first system configuration operation at the first information handling system;
determining, by the first processor, whether the first system configuration operation completed successfully;
providing a first abstraction to a second processor, the first abstraction providing information to enable a third processor at a second information handling system to perform the first system configuration operation at the second information handling system;
receiving a first identifier from the second processor, the first identifier generated by the second processor and uniquely identifying the first abstraction; and
storing the first identifier at the first processor.

2. The method of claim 1, further comprising:
receiving a notification at the first processor, the notification provided by the second processor and including a second identifier;
determining at the first processor a second configuration operation identified by the second identifier has not been performed at the first information handling system;
providing a request to the second processor for configuration information, the request including the second identifier;
receiving a second abstraction in response to the request, the second abstraction to enable the first processor to perform the second configuration operation at the first information handling system; and
providing an acknowledgment to the second processor, the acknowledgement including the second identifier and indicating the second system configuration operation completed successfully.

3. The method of claim 1, further comprising:
providing a request for a system configuration snapshot to the second processor, the snapshot defining operations to configure one or more devices at the first information handling system to a first configuration state;
receiving the system configuration snapshot at the first processor, the snapshot including a second identifier; and
providing an acknowledgment to the second processor in response to determining at the first processor that the operations defined by the system configuration snapshot completed successfully, the acknowledgment including the second identifier.

4. The method of claim 1, further comprising:
receiving at the first processor a request from the second processor, the request for a system configuration snapshot indicating a first configuration of the first information handling system at the time the request is received, the snapshot providing information to enable configuring a second information handling system to the first configuration; and
providing the system configuration snapshot to the second processor.

5. The method of claim 1, wherein the first abstraction identifies a configuration operation and a target of the operation, and includes payload data representing configuration information to be installed at the target.

6. The method of claim 1, wherein the first identifier indicates a position in a temporal sequence relative to another identifier.

7. The method of claim 1, further comprising:
receiving a second request at the first processor at the first information handling system, the second request to perform a second system configuration operation at the first information handling system;
determining at the first processor the second system configuration operation completed successfully;
providing a second abstraction to the second processor, the second abstraction providing information to enable the third processor at the second information handling system to perform the second system configuration operation at the second information handling system;
receiving a second identifier from the second processor, the second identifier generated by the second processor and uniquely identifying the second abstraction; and
storing the second identifier at the first processor.

8. The method of claim 1, wherein providing the first abstraction further comprises providing the first abstraction prior to enabling operation of an operating system at the first information handling system.

9. The method of claim 1, wherein the first processor is a management controller at the information handling system, the controller providing out-of-band communications with the second processor.

10. The method of claim 1, wherein the first processor is not configured to administer a primary operating system associated with the first information handling system.

11. A method comprising:
receiving a notification at a first processor from a second processor at a first information handling system, the notification indicating whether a first system configuration operation completed successfully at the first information handling system;
if the notification includes a first identifier:
associating the first identifier with the second processor to indicate that the second processor completed the first system configuration operation; and
if the notification includes a first abstraction:
generating the first identifier, the first identifier uniquely identifying the first abstraction;
providing the first identifier to the second processor;
storing the first abstraction at the first processor; and
associating the first identifier with the second processor to indicate that the second processor completed the first system configuration operation;
wherein the first abstraction provides information to enable a third processor at a second information handling system to perform the first system configuration operation at the second information handling system.

12. The method of claim 11, further comprising:
maintaining at the first processor a database identifying a plurality of processors including the second processor, the database associating each processor of the plurality of processors with a respective identifier indicating the most recent configuration operation performed by each processor.

13. The method of claim 12, further comprising:
providing a request to the second processor, the request for a system configuration snapshot indicating a first configuration of the first information handling system at the time the request is received, the snapshot providing information to enable configuring a second information handling system to the first configuration;
receiving the requested system configuration snapshot; and
storing the system configuration snapshot at the first processor.

14. The method of claim 11, wherein the first processor is a management controller at the information handling system, the controller providing out-of-band communications with the second processor.

15. The method of claim 11, wherein the first abstraction identifies a configuration operation and a target of the operation, and includes payload data representing configuration information to be installed at the target.

16. A system comprising:
a provisioning server;
a first information handling system including a first processor, the first processor configured to:
receive a first request to perform a first system configuration operation at the first information handling system;
determine whether the first system configuration operation completed successfully;
provide a first abstraction to a second processor at the provisioning server, the first abstraction providing information to enable a third processor at a second information handling system to perform the first system configuration operation at the second information handling system;
receive a first identifier from the second processor, the first identifier generated by the second processor and uniquely identifying the first abstraction; and
storing the first identifier at the first processor.

17. The system of claim 16, wherein the first processor is further configured to:
receive a notification from the second processor, the notification including a second identifier;
determine a second configuration operation identified by the second identifier has not been performed at the first information handling system;
provide a request to the second processor for configuration information, the request including the second identifier;
receive a second abstraction in response to the request, the second abstraction to enable the first processor to perform the second configuration operation at the first information handling system; and
provide an acknowledgment to the second processor, the acknowledgement including the second identifier and indicating the second system configuration operation completed successfully.

18. The system of claim 16, wherein the first processor is further configured to:
provide a request for a system configuration snapshot to the second processor, the snapshot defining operations to configure one or more devices at the first information handling system to a first configuration state;
receive the system configuration snapshot, the snapshot including a second identifier; and
provide an acknowledgment to the second processor in response to determining at the first processor that the operations defined by the system configuration snapshot completed successfully, the acknowledgment including the second identifier.

19. The system of claim 16, wherein the first processor is further configured to:
receive a request from the second processor, the request for a system configuration snapshot indicating a first configuration of the first information handling system at the time the request is received, the snapshot providing information to enable configuring a second information handling system to the first configuration; and
provide the system configuration snapshot to the second processor.

20. The system of claim 16, wherein the first abstraction identifies a configuration operation and a target of the operation, and includes payload data representing configuration information to be installed at the target.

\* \* \* \* \*